No. 661,205. Patented Nov. 6, 1900.
F. J. BURGI.
APPARATUS FOR COVERING IRREGULAR SURFACES, SUCH AS RELIEF MAPS.
(Application filed Jan. 9, 1900.)
(No Model.)
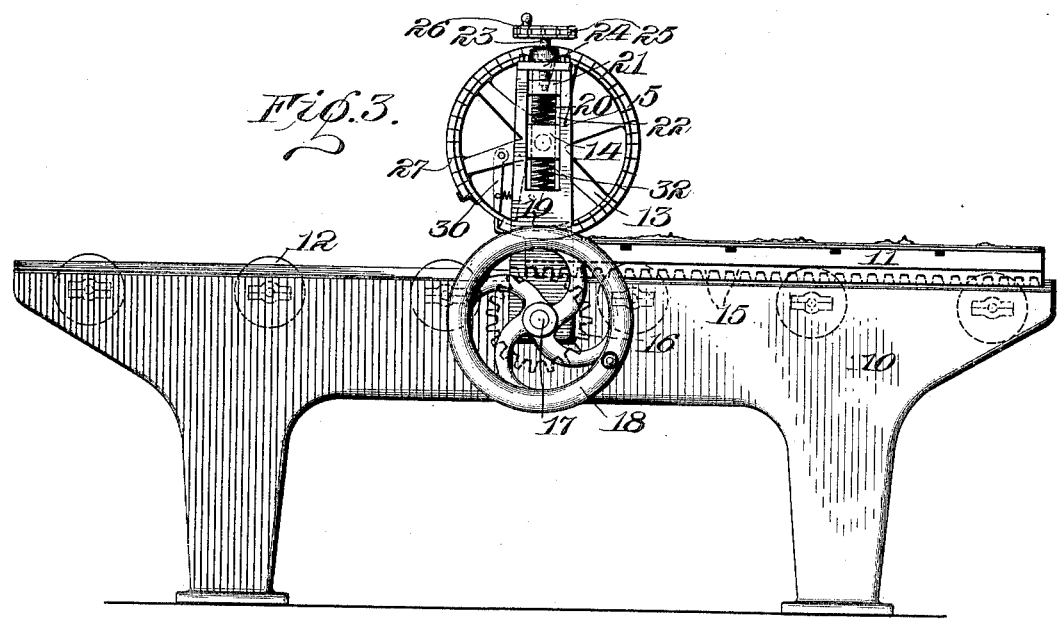
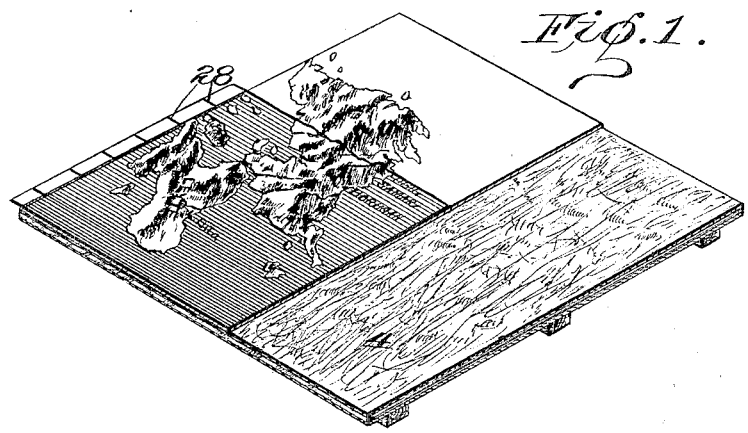
Witnesses.
Walter B. Payne.
Thomas Durant
Inventor.
Frederick J. Burgi
by Church & Church
his Attorneys.

UNITED STATES PATENT OFFICE.

FREDERICK J. BURGI, OF ROCHESTER, NEW YORK.

APPARATUS FOR COVERING IRREGULAR SURFACES, SUCH AS RELIEF-MAPS.

SPECIFICATION forming part of Letters Patent No. 661,205, dated November 6, 1900.

Application filed January 9, 1900. Serial No. 886. (No model.)

*To all whom it may concern:*

Be it known that I, FREDERICK J. BURGI, of Rochester, in the county of Monroe and State of New York, have invented certain new and useful Improvements in Apparatus for Covering Irregular Surfaces, such as Relief-Maps; and I do hereby declare the following to be a full, clear, and exact description of the same, reference being had to the accompanying drawings, forming a part of this specification, and to the reference-numerals marked thereon.

My present invention has for its object to provide means whereby a printed map-sheet may be applied to a relief-surface representing the same geographical territory and showing the elevations and depressions thereof.

While the apparatus I have shown and described is particularly adapted for mapwork, it could also be employed to cover other modeled objects of irregular contour; and to these ends it consists in certain improvements and combinations of parts, all as will be hereinafter described, the novel features being pointed out in the claims at the end of this specification.

In the drawings, Figure 1 is a perspective view of a relief-map constructed in accordance with my invention, showing various portions broken away to more clearly illustrate the construction; Fig. 2, a sectional view of the modeling-board, and Fig. 3 a side elevation of a cylinder-press employed in applying the printed map to the surface of the model.

Similar reference-numerals in the different figures indicate similar parts.

In carrying out my invention I first prepare a map of such a section of the country as I desire to reproduce and paste a copy thereof upon the flat surface of a modeling-board 1. I now take heavy cardboard equal in thickness to the difference in elevation as represented by the different contour-lines and cut it out to correspond to the outline of these lines, so that for each elevation, as indicated by a contour-line on the map, there will be a separate sheet 2 of cardboard. These sheets are then arranged in layers in the correct position upon the modeling-board, the map thereon assisting in their proper location. The various layers may be glued or otherwise secured to the board and in this position represent a series of steps, as shown in Fig. 2, the edge of each step representing the contour or outline for that particular elevation above the sea-level. The extreme elevations ending in prominent points, such as mountain peaks, I establish by pins 3, the height of which are accurately measured from the surface of the board. Wax or other plastic material is filled into the steps and manipulated by hand or with the use of suitable tools to form a correct representation of the topography of the country. After a completion of the wax model I make a cast therefrom in plaster-of-paris, and from the latter I also obtain a reproduction in plaster of the original model, which may then be destroyed. These casts are mounted in suitable frames, and when thoroughly dry and hardened their surfaces are coated with shellac or similar material to exclude the moisture and increase their hardness. They now constitute male and female dies, which I employ in producing my maps, as will be described. The surface of the female die is first oiled or otherwise treated to prevent the material applied thereto from adhering, and over the surface I pour a solution in a more or less plastic condition and which is capable of setting or hardening, composed, preferably, of plaster-of-paris and other substances adapted to assist in hardening and strengthening the cast, which for convenience will hereinafter be referred to as the "relief-map." After applying the solution it is thoroughly worked into all the depressions in the die, and while in a moist condition I apply a suitable backing 4, (shown in Fig. 1,) which may be weighted to compress the composition into the face of the mold and also to cause it to adhere to the backing. When the composition has been thoroughly dried, the relief-map is removed from the die and is then ready to have the printed map applied to its surface. In applying the printed map to the relief-surface I employ a die identical with the plaster female-die, in which the relief-map is cast and obtained by casting from the male plaster-die a female die or matrix 5 in rubber, printer's inking-roller composition, or other elastic material, which is an exact counterpart of the relief-map. The printed paper map is soaked in water or other suitable solution until thoroughly saturated and its fibers are capable of being stretched considerably without tearing apart. It is then applied to the face of the flexible die 5, and the latter, beginning at one end, is carefully rolled upon the relief-surface, causing the map to be applied evenly and smoothly.

In making maps of a large area the dies are heavy and cumbersome, and as great accuracy is required in applying the printed map to the relief-surface I employ an apparatus upon which the parts may be mounted, whereby the printed map may be caused to register accurately with the surface upon which it is applied. The apparatus I employ embodies, essentially, a frame 10, carrying a reciprocating bed 11, traveling on rollers 12, and a cylinder 13, mounted in bearings 14 upon its opposite ends and adapted to receive the flexible or female die 5 and to be rotated by frictional engagement between the die and the relief-map mounted on the bed 11. The bed is provided upon its under side with a rack 15 (shown in dotted lines) and is adapted to be operated by means of a pinion 16, secured on a transverse shaft 17, mounted in the frame and carrying upon one extremity a hand operating-wheel 18. Directly above the shaft 17 are arranged upright brackets 19, having the slots in their upper ends containing springs 32, supporting the bearings 14, and upon the latter are provided springs 20, the supporting-plates 21 sliding on guides 22, arranged upon the proximate faces of the slots and receiving the thrust of a set-screw 23, operating through a cap-plate 24. As the parts just described are duplicated upon the opposite side of the machine and as the two sides are adjusted equally, I provide the set-screws with sprocket-wheels 25 and connect them for simultaneous operation by means of a chain 26, as usual in roller-adjusting mechanism. Upon the ends of the cylinder 13 are provided marks or divisions 27, equally spaced, and upon the surface of the bed 11 are similar marks or divisions, with which the former are adapted to register. In printing my maps I also provide upon their margins lines or marks 28 similarly spaced, as shown in Fig. 1.

In using my apparatus the flexible female die is first glued or otherwise secured to the face of the drum or cylinder 13 and the relief-map is adjusted on the bed 11 so that the depressed portions in the flexible female die shall coincide accurately with the elevated points on the relief-map. The latter is then bolted or securely fastened on the bed. The printed map-sheet after having been soaked is placed face downward around the die on the cylinder and the end of the sheet is secured by means of spring-operated gripping-fingers 30, engaging the face of the die at one end. The margins of the map-sheet project beyond the sides of the die and the former is adjusted so that the marks thereon coincide with those upon the ends of the cylinder or roller. A thin glue, paste, or other adhesive is applied to the face of the relief-map when the bed is brought beneath the cylinder and the latter lowered by means of the screws 23 and adjusted so that the first marks or indices upon the cylinder and bed register, when the set-screws may be still further adjusted, so that the female die 5 will lightly engage the face of the relief-map. The shaft 17 is now revolved by means of the hand-wheel 18, causing the bed to pass beneath the cylinder, revolving the latter and causing the printed map-sheet to be transposed to and pressed upon the relief-surface. The portions of the map representing the higher altitudes lie over the depressions in the female die, and as the latter revolves upon the relief-surface the projections thereon will engage the moist map-sheet and stretch the latter as they pass into their corresponding depressions in the flexible die. In this operation great care must be taken to prevent the map-sheet from being stretched longitudinally, so that the elevated portions thereon will fail to register accurately with the corresponding portions on the relief-map. This difficulty is easily overcome and the map accurately applied by a careful observation and comparison of the index-marks on the edges of the cylinder and the margin of the map-sheet. If for any reason as the work progresses the marks upon the latter are seen to be advancing over those on the former, there is an indication that too great a pressure is being applied between the relief-map and the die, which is causing the map-sheet to be stretched lengthwise. The set-screws 23 may be adjusted to reduce the pressure and the operation continued, or, if the reverse occurs and the index-marks on the map-sheet fall behind those on the cylinder, the screws may be operated downwardly and the pressure increased.

The apparatus I have described for applying a printed map to a similar map having a relief-surface is equally applicable for applying any covering material to an irregular or embossed surface. The flexible die may be made directly from the surface of the object to be covered or in the manner I have described, and it may be applied by hand or by any desirable and convenient apparatus, whereby the pressure between it and the relief-surface may be regulated to insure the proper application of the covering-sheet, whereby the printed characters or symbols may register accurately and be applied smoothly and evenly on the relief-surface.

I claim as my invention—

1. A means for applying a pliable sheet of material to an irregular surface consisting of a die formed as a counterpart of said surface between the face of which and the said surface the pliable sheet is pressed.

2. A means for applying to an irregular surface a pliable covering, consisting of a flexible die corresponding to the said surface carrying upon its face the covering which is transferred to the face of the surface and made to conform to its irregularities by the pressure between the parts.

3. A device for applying to an irregular or relief surface, a covering of pliable material capable of stretching, consisting of a flexible die, the counterpart of the said surface, and means for rolling the die upon the relief-surface to apply the covering thereto.

4. In a device for applying a covering to a relief-surface, the combination with a flexible die the counterpart of said surface, mounted on a curved support carrying the pliable covering-sheet upon its face, and means for causing the die to register with the relief-surface and apply the covering-sheet as the faces of the die and relief-surfaces are brought together.

5. In a device for applying coverings to relief-surfaces, the combination with a flexible die mounted upon a roller carrying a pliable covering-sheet upon its face, of means for causing the die to register with the relief-surface and the faces of the two to pass in contact with each other, whereby the covering-sheet will be transposed to the relief-surface.

6. In a device for applying coverings to irregular surfaces, the combination with a roller carrying a flexible die having index-marks and supporting a pliable covering mounted upon its face having corresponding index-marks, of means for causing the die to register with the surface and the faces of the two to be passed in contact with each other, and tension devices for regulating the pressure between the parts.

7. In a device for applying a covering to an irregular surface, the combination with a roller carrying a flexible die mounted in bearings and having index-marks coöperating with corresponding marks upon the face of the pliable covering-sheet, of a movable bed carrying the relief-surface, adjusting devices for causing a contact and regulating the pressure between the die and relief-surface, and means for operating the bed and die.

8. In a device for applying a covering to an irregular surface, the combination with a frame having the supports, the cylinder or roller mounted in bearings and adjustable on the supports, the flexible die mounted on the roller supporting the pliable covering-sheet, of the reciprocating bed, as the frame, carrying the relief-surface, adjusting devices for causing a contact between the die and relief-surface, and means for operating one of the parts, whereby the die and its coöperating surface will be passed into contact throughout their length to transpose the covering-sheet from the former to the latter.

9. In a device for applying a covering-sheet to an irregular surface, the combination with a frame, having the supports, the cylinder mounted in bearings movable on the supports, the flexible die mounted on the cylinder, of the bed mounted upon the frame, means for reciprocating the latter beneath the cylinder, adjusting devices for moving the latter relatively of the bed, and the relief-surface corresponding to the die mounted upon the bed.

FREDERICK J. BURGI.

Witnesses:
G. WILLARD RICH,
F. F. CHURCH.